United States Patent
Wadsworth et al.

(10) Patent No.: US 6,960,044 B2
(45) Date of Patent: Nov. 1, 2005

(54) SUPPORT FRAME KIT FOR CANOPIES, DISPLAY RACKS AND THE LIKE

(75) Inventors: Van Wadsworth, Union Springs, AL (US); Bill Moorer, Union Springs, AL (US); Gene Combest, Union Springs, AL (US)

(73) Assignee: C & W Industries, LLC, Union Springs, AL (US)

( * ) Notice: Subject to any disclaimer, the term of this patent is extended or adjusted under 35 U.S.C. 154(b) by 138 days.

(21) Appl. No.: 10/373,870

(22) Filed: Feb. 27, 2003

(65) Prior Publication Data

US 2004/0170471 A1 Sep. 2, 2004

(51) Int. Cl.$^7$ .............................. F16I 41/00
(52) U.S. Cl. ............... 403/169; 403/217; 52/651.1; 135/909
(58) Field of Search ............... 403/169–172, 403/217–219, 187–188, 49; 52/651.1, 645; 135/909

(56) References Cited

U.S. PATENT DOCUMENTS

| | | |
|---|---|---|
| 3,243,051 A | 3/1966 | Ruhnke |
| 3,245,188 A * | 4/1966 | Stanford ................. 403/49 X |
| 3,545,123 A | 12/1970 | Muller |
| 3,715,136 A | 2/1973 | Yoshida |
| 3,837,754 A | 9/1974 | Malcik |
| 3,972,638 A | 8/1976 | Vivoli |
| 4,023,913 A | 5/1977 | Berkowitz |
| 4,054,392 A | 10/1977 | Oppenheim |
| 4,111,577 A | 9/1978 | Kiyosawa |
| 4,673,308 A | 6/1987 | Reilly |
| 4,948,289 A * | 8/1990 | Dellinger .................... 403/246 |
| 5,048,995 A | 9/1991 | Beaulieu |
| 5,605,204 A * | 2/1997 | Ausejo .................. 403/246 X |
| 5,788,400 A | 8/1998 | Wey |

FOREIGN PATENT DOCUMENTS

GB    2 219 060 A    11/1989

* cited by examiner

*Primary Examiner*—John R. Cottingham
(74) *Attorney, Agent, or Firm*—Millen, White, Zelano & Branigan, P.C.

(57) ABSTRACT

A support frame kit for canopies and display racks includes vertical posts and horizontal rails which are coupled to one another by square sockets mounted on the posts which receive square pintles projecting from the ends of the rails. In accordance with one embodiment of the invention, the rails are secured to the posts by removable pins and provide support for a canopy which is attached at its periphery to peripheral rails by attachment loops. In another embodiment of the invention rails are joined by struts and project from couplings fixed to the posts to provide shelves of a display rack.

9 Claims, 9 Drawing Sheets

US 6,960,044 B2

SUPPORT FRAME KIT FOR CANOPIES, DISPLAY RACKS AND THE LIKE

BACKGROUND OF THE INVENTION

1.) Field of the Invention

The present invention relates to a support frame kit for canopies, display racks and the like. More particularly, the present invention is directed to a support frame kit comprised of interlocking posts and rails which when assembled provide a rigid frame assembly.

2.) Background Art

There is a need for support frames which can serve to support items such as canopies, display racks and the like, wherein the support frames can be erected and disassembled rapidly and require minimal storage space when disassembled. It is also desirable that such support frames be relatively robust so that they can remain erect for relatively long periods of time and so that they can withstand wind and rain.

Framing structures have a use in providing shade for product displays, such as gardening product displays and for providing shelving for such displays. Gardening products, which include plants and bagged goods that are frequently stored out of doors, can be subject to intense sunlight which can compromise the health of plants and damage or fade bagged goods such as mulch and seed. Moreover, customers are more inclined to peruse retail items if those items are in shaded and vented climate, rather than being out in the hot sun.

With these considerations and other considerations in mind, there is need for a support frame kit which would allow retail establishments to more effectively store and display goods out of doors during hot weather. In addition, it is desirable to provide shade for general purposes during hot weather or, for that matter, to provide cover for other purposes during inclimate weather which can be rapidly erected and taken down.

SUMMARY OF THE INVENTION

In view of the aforementioned considerations, a support frame kit is provided, which kit comprises at least two posts, each post having a first end, a second end and a longitudinal axis. Sockets, each having a non-round opening therein are fixed to the posts, at locations laterally spaced from the longitudinal axis thereof and adjacent to at least the second ends of the posts. Rails are provided having first and second ends. At least one non-rotatable pintle projects transversely from at least one end of each rail, the pintle having an exterior geometry corresponding to the interior geometry of the socket so that the rails do not rotate with respect to the sockets.

In a first aspect of the invention, the sockets and pintles are rectangular or non-round in cross section, and in a further aspect of the invention, the sockets are longitudinally spaced from at least one end of the posts on which they are positioned.

In further aspects of the invention, there are two sockets on opposite sides of each of the posts, or four sockets spaced at 90° intervals around each of the posts.

In an additional aspect of the invention, the non-rotatable pintles may be locked in the sockets utilizing a locking or latching element such as, for example, a laterally insertable pin.

The aforedescribed support frame kit is usable to configure a frame in combination with a canopy, wherein the posts keep the canopy spaced from the ground; wherein the rails interlock with the posts to keep the posts vertically disposed, and wherein the rails provide structure for attaching the canopy thereto adjacent to the periphery of the canopy.

The aforedescribed support frame kit also finds use as a support for a display rack, wherein rails projecting horizontally from posts are joined by elongated members to form structures such as shelves.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
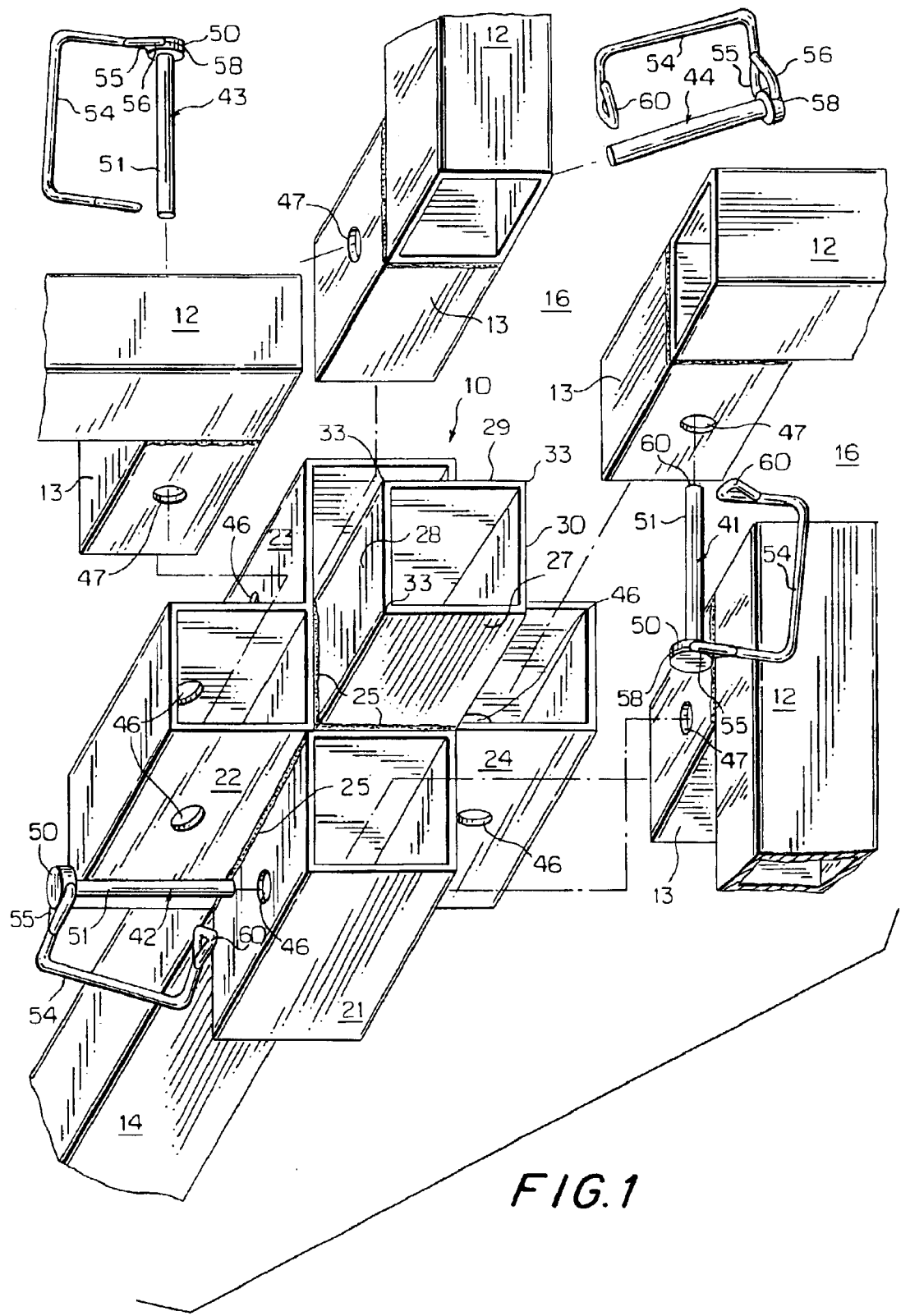
FIG. 1 is an exploded, perspective view of a coupling arrangement for coupling a plurality of rails to a post.

Referring now to FIG. 1 there is shown a coupling 10 for coupling at least one of a plurality of rails 12, each having at least one non-rotatable pintle 13 projecting therefrom to provide a post coupling for coupling to a post 14 that cooperates therewith to form a canopy support frame kit 16. The post 14 has four sockets 21, 22, 23 and 24 comprising a rail coupling which are welded by external welds 25 to four sides 27, 28, 29 and 30 of the post, wherein each socket is adapted to receive a non-rotatable pintle 13 to couple a rail 12 to the post. The post 14 is rectangular (preferably square) in cross section and the sockets 21–24 are also rectangular (preferably square) in cross section, but are slightly smaller in cross section than the post so that longitudinal wells 25 weld through to the corners 33 of the post to form a robust and secure weld of the sockets to the post.

The kit 16 further includes four pins 41, 42, 43 and 44 which pass through holes 46 in the sockets 21–24 and through aligned holes 47 in the non-rotatable pintles 13 which project from rails 12 when the rotatable pintles 13 are received in the sockets 21–24. Each of the pins 41–44 has a head 50 which is attached to a shank 51. Each of the pins 41–44 also has a spring wire retainer 54 which is U-shaped in order to keep the pins in place when passed through the holes 46 in the sockets 21–44 and the holes 47 aligned therewith in the non-rotatable pintles 13. The spring wire retainers 54 have a first end 55 with a triangular portion 56 which fit through apertures 58 in the heads 50 of the pins 41–44 and triangular free ends 60 which receives the shanks 51 the pins therethrough. In order to secure the pins 41–44 after they are inserted, the spring wire retainers 54 are flexed to spread the ends 55 and 60, so as to clear the shanks 51 of the pins and the triangular ends 60 are then slid over the shanks.

Figure 2:
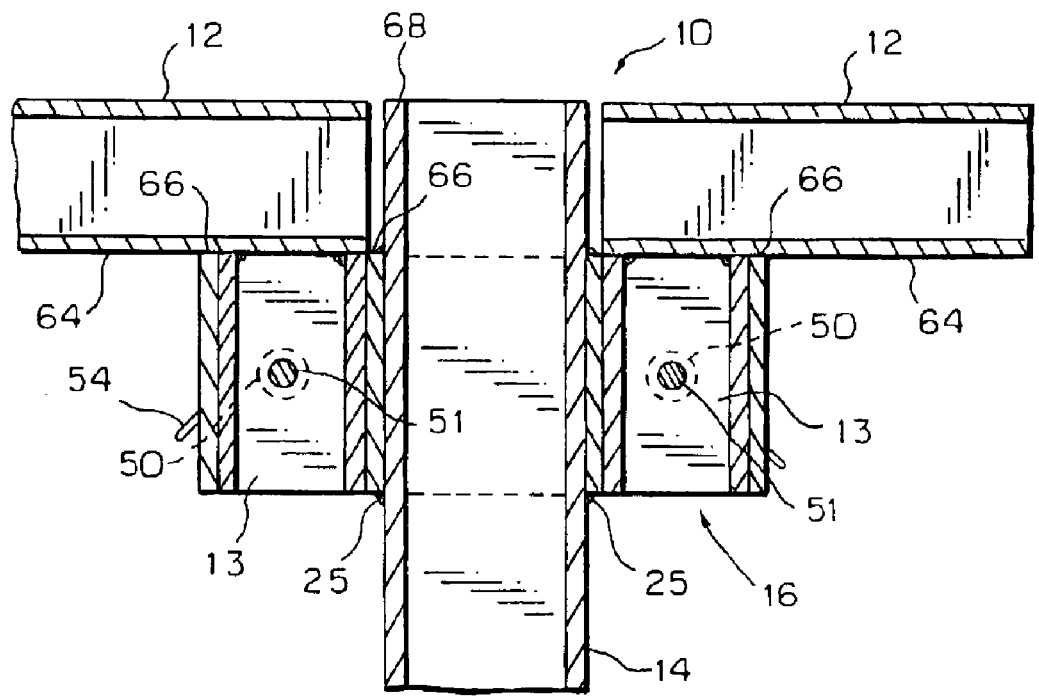
FIG. 2 is a side elevation showing rails coupled to the post of FIG. 1.

The components of the kit 16 shown in FIG. 1, comprising the post 14, the rails 12 and the pins 41–44, are assembled to provide a support frame as is shown in FIG. 2 by inserting the non-rotatable pintles 21–24, having a square cross section, into sockets 21–24 as is shown in FIG. 2. When the bottom surfaces 64 of the rails 12 abut the top surfaces 66 of the sockets 21–24, the holes 47 through the non-rotatable pintles 13 align with the holes 46 through the sockets so that the shanks 51 of the pins 41–44 pass through the holes. The triangular free ends 60 of the wire retainers 54 fit over the shanks 51 of the pins 41–44 so that the pins are retained in the holes 46–47 and the non-rotatable pintles 13 cannot pull from the sockets 21–24. This holds the rails 12 in place.

Preferably, the rails 12 when mounted on the posts 14 by insertion of the non-rotatable pintles 13 in the sockets 21–24, do not extend above the top surface 68 of the posts 14. This is because the sockets 21–24 are longitudinally spaced from the end surfaces 68 of the posts 14 by a distance substantially equal to the width of he rails 12.

By making the rails 12, pintles 13, posts 14 and sockets 21–24 from hollow steel bars that are square in cross-section, relatively inexpensive stock materials may be utilized to make the support frame kit 16 which may be assembled into support frame by utilizing couplings 10.

Figure 3:
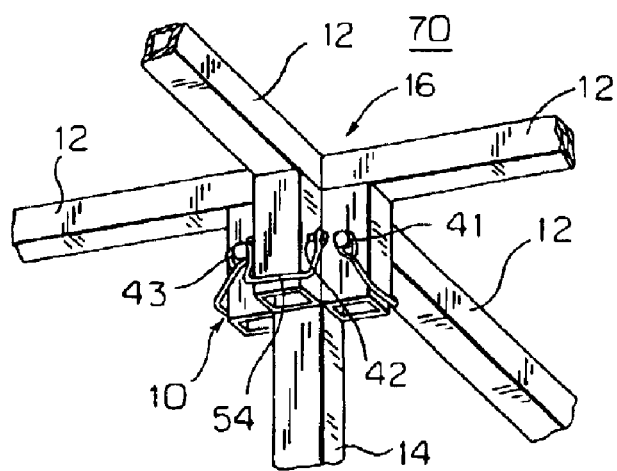
FIG. 3 is a perspective view showing four rails coupled to the post of FIGS. 1 and 2.
Figure 4:
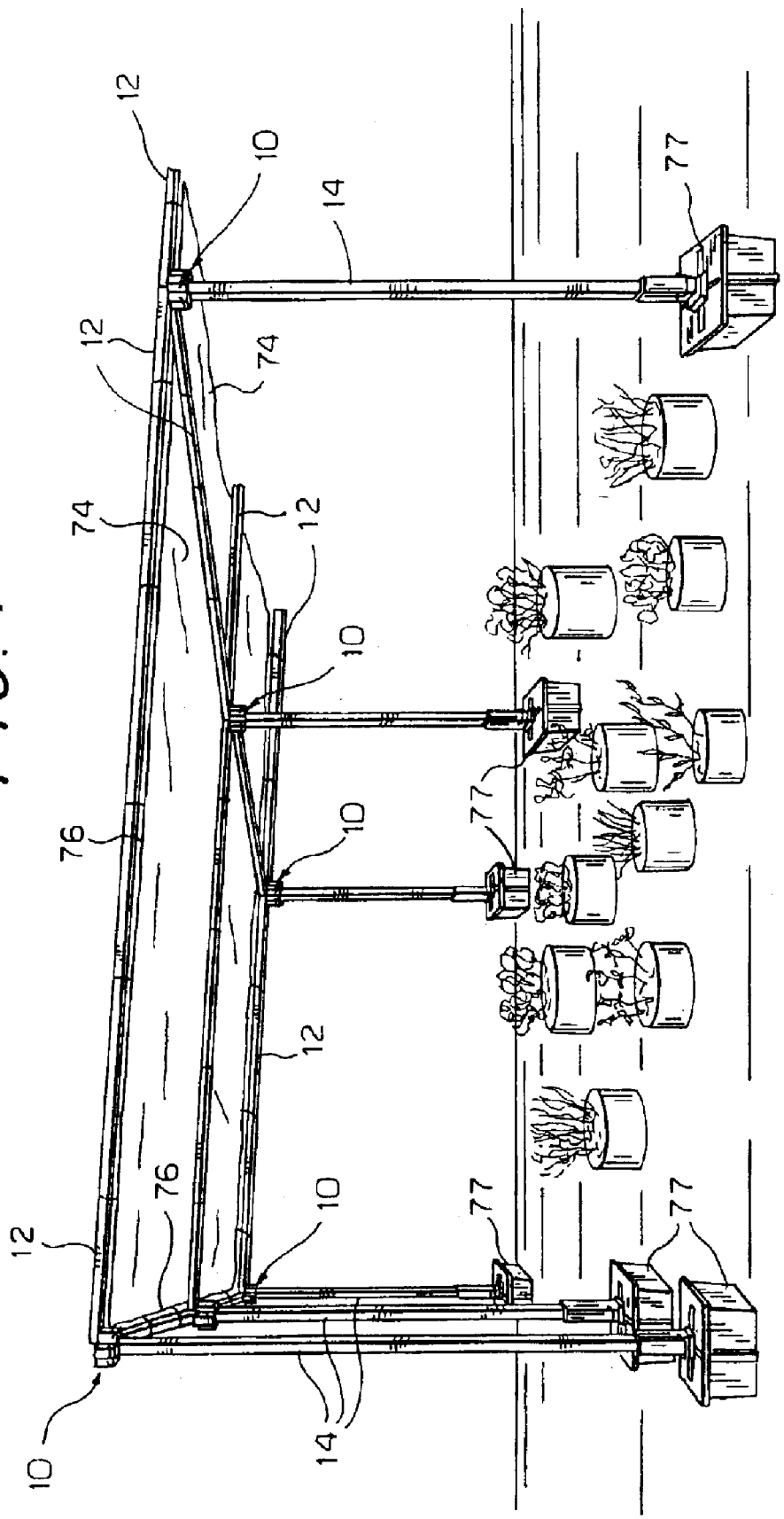
FIG. 4 is a perspective view of a coupling of FIGS. 1 and 2 used to configure a support frame for supporting a canopy.

Referring now to FIGS. 3 and 4 it is seen that the support frame kit 16 of FIGS. 1 and 2 is assembled to provide a canopy support frame 70 for supporting a canopy 74 (see FIG. 4). As is apparent from FIG. 4, the posts 14 disposed at the periphery 76 of the canopy 74 support two rails 12, whereas all four of the sockets 21–24 are used for supporting four rails inside the periphery of the canopy 74. The periphery 76 of the canopy 74 is attached to peripheral rails 12 of the frame by conventional attachment loops which pass through eyelets in the periphery canopy and around the peripheral rails 12. Alternatively, a continuous strand may be passed around the rails 12 and through holes in the periphery 76 of the canopy 74.

If the canopy 74 is used for protective shade, it is perforated to resemble netting in at least some aspects. Consequently, shade is provided while allowing wind and rain to pass therethrough. A canopy such as the canopy 74 provides a local climate 20° cooler than the outside environment adjacent to the canopy. The canopy 74 and frame 74 can remain up during the spring, summer and fall and then be disassembled and folded up for winter storage in a relatively small space.

Figure 5:
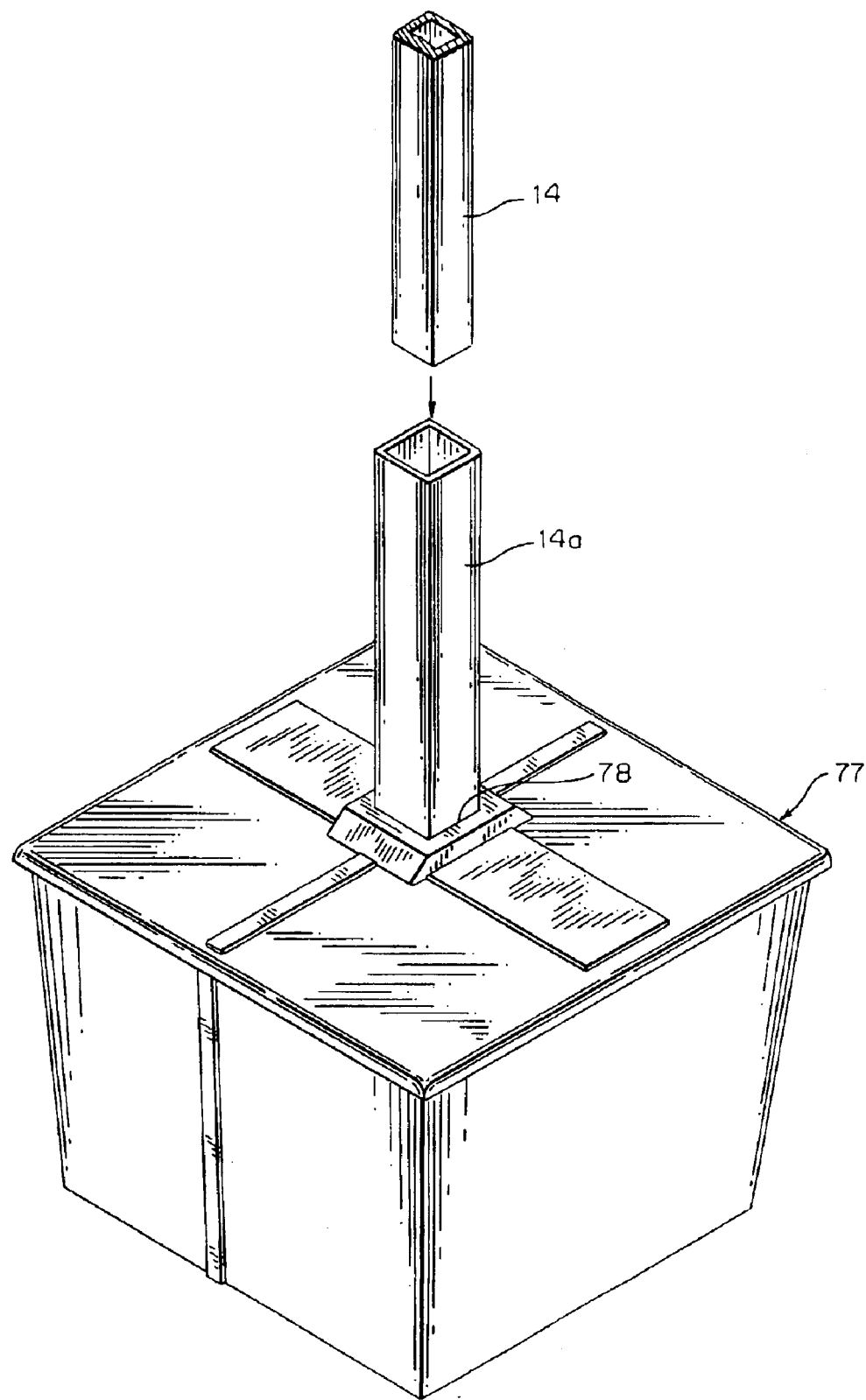
FIG. 5 is a perspective view of a support box for the posts of FIGS. 1–4.

As is shown in FIGS. 4 and 5, the posts 14 are preferably each supported vertically by concrete filled plastic containers 77 having hollow post supports 14a which are received in square holes 78 in the containers. Since the post supports 14a are square and hollow, the concrete within the containers 77 bonds therewith upon curing to hold the post supports securely in the containers. After the post supports 14a have been embedded in the concrete in boxes 77 and the concrete has cured, the posts 14 which support the canopy 74 are inserted over the hollow post supports and are retained by pins 79. The pins 79 are preferably identical to the pins 41–44 of FIG. 1 in that the pins 79 are locked in place by spring wire retainers 54 which pass through aligned holes in the posts 14 and post supports 14a. Since the post supports 14a are bonded to the concrete and the posts 14 are mechanically locked to the post supports, the posts and thus the canopy support frame 70 and canopy 74 itself are anchored to the ground. While the support posts 14a are shown telescoped into the posts 14, the post supports 14a can also be dimensioned to receive the posts therein.

Figure 6:
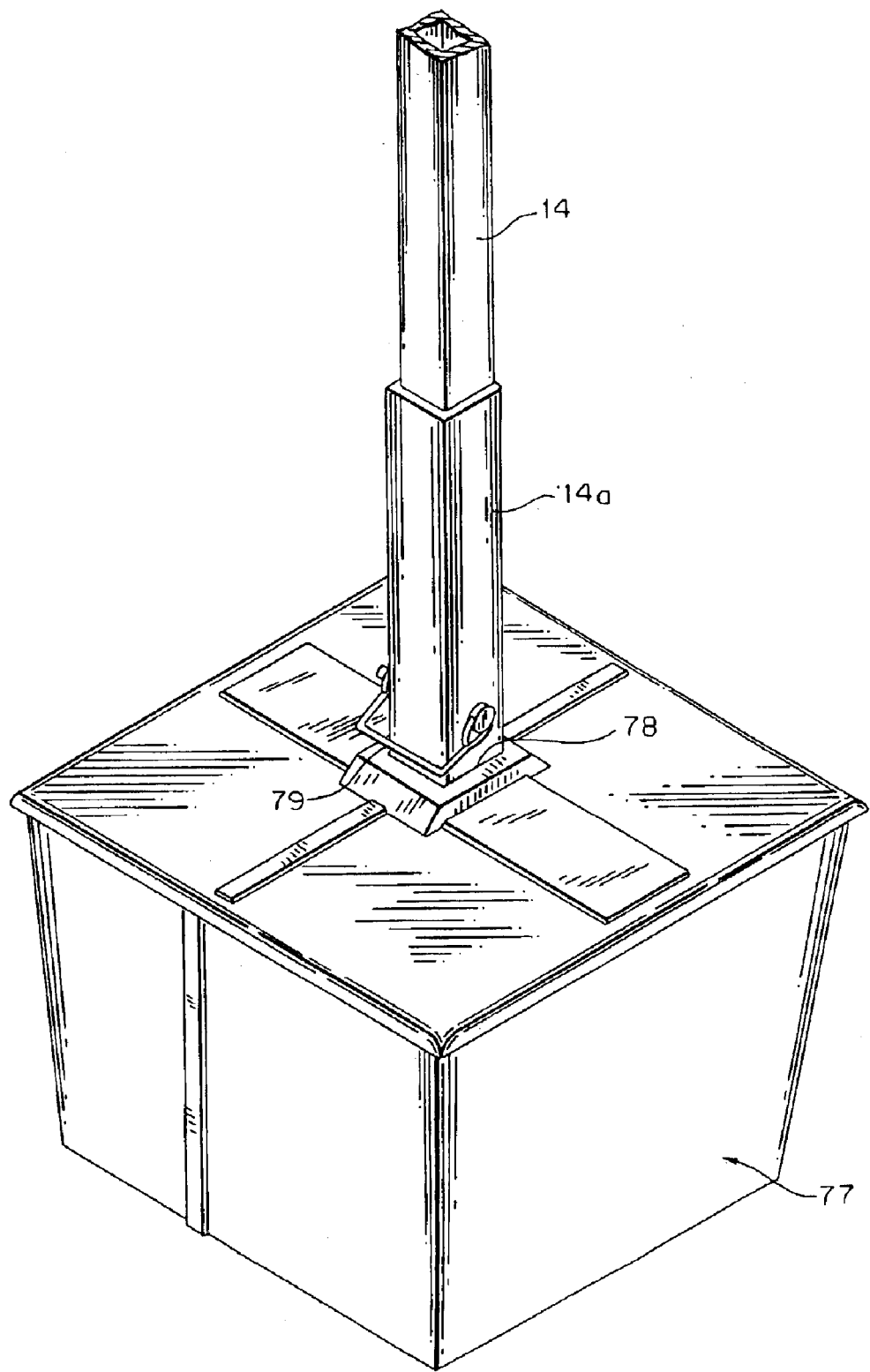
FIG. 6 is a view similar to FIG. 5 showing a post supported by the support box of FIG. 5.

While the concrete containing boxes 77 of FIGS. 5 and 6 are preferable structure for supporting the canopy support frame 70, other anchors and supports are usable with the canopy supporting frame of the present invention, such as but not limited to, pre-sunk locking sockets and platform couplings. Referring now to FIGS. 7–11, a second embodiment 80 of a support frame kit 81 is illustrated, wherein the kit comprises a coupling 10' for coupling a rail 12' with a projecting, non-rotatable pintle 13' on a post 14' having only two sockets 22' and 24' welded thereto. Non-rotatable pintles 13' and sockets 22' and 24' each have a rectangular, preferably square, cross section with the non-rotatable pintles complementing the sockets upon sliding into the sockets as seen in FIG. 8. Consequently, rails 12' are non-rotatably retained on the posts 14' with relative rigidity.

The resulting canopy support frame is unobstructed between the posts because only the rails 12 hold the top of the posts 14 in horizontal spaces relation to one another, as is seen in FIG. 4.

Figure 7:
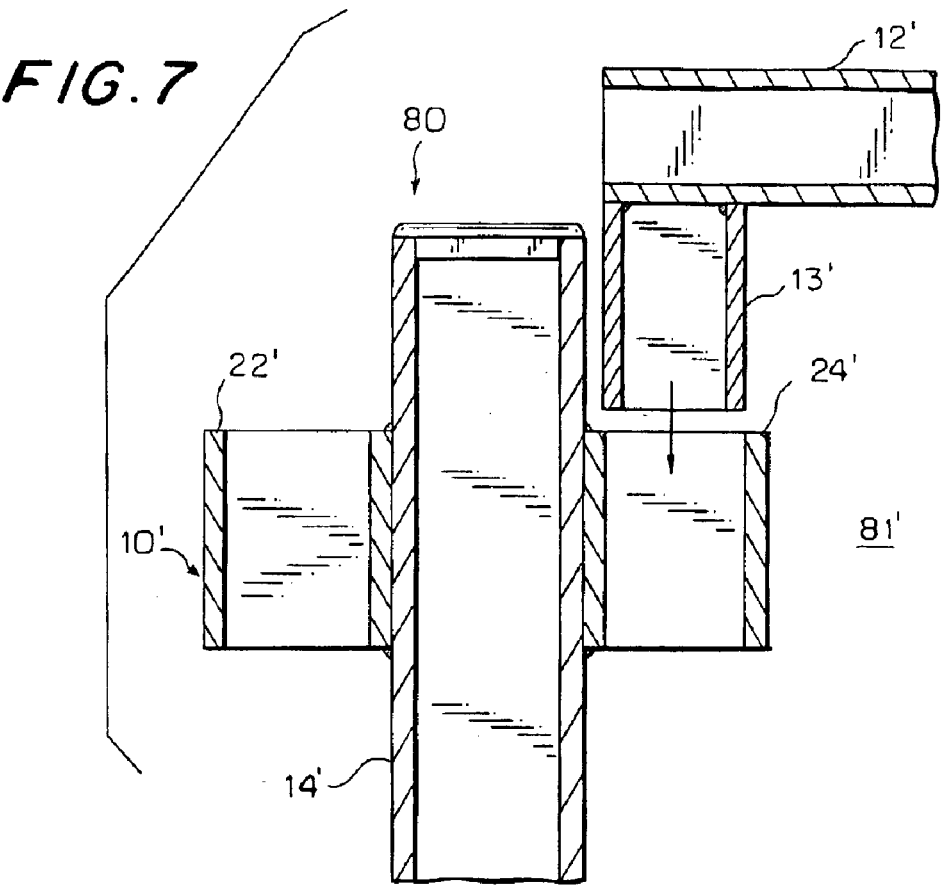
FIG. 7 is a perspective view of a second embodiment of a coupling in accordance with the present invention for coupling at least one rail to at least one post.
Figure 8:
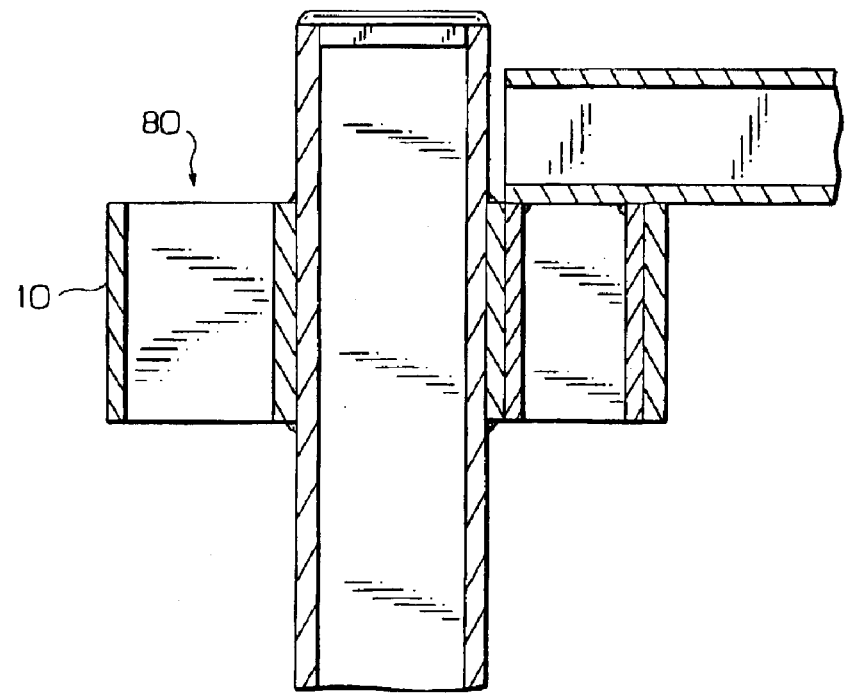
FIG. 8 is a side elevation of the coupling of FIG. 7.

The support frame kit 81 of FIG. 7 can be used to make a display rack 83 as is shown in FIGS. 9–12. As is seen in these Figures, the display rack 83 is comprised of at least a pair of posts 14' having spaced longitudinal stations therealong with the couplings 10' each preferably having two sockets 22' and 24'. The bottom coupling 10' has a bottom rail 84 with an upwardly extendable, non-rotatable pintle 13' that is received in a downwardly facing opening in socket 24' Since the bottom rail 84 is hollow, it can receive therein a telescoping rail 85 which is slidable to extend in the opposite direction of the rail 84. Both the rails 84 and 85 have feet 87 thereon which engage the ground so as to support the rack 83 in spaced relation to the ground.

Figure 9:
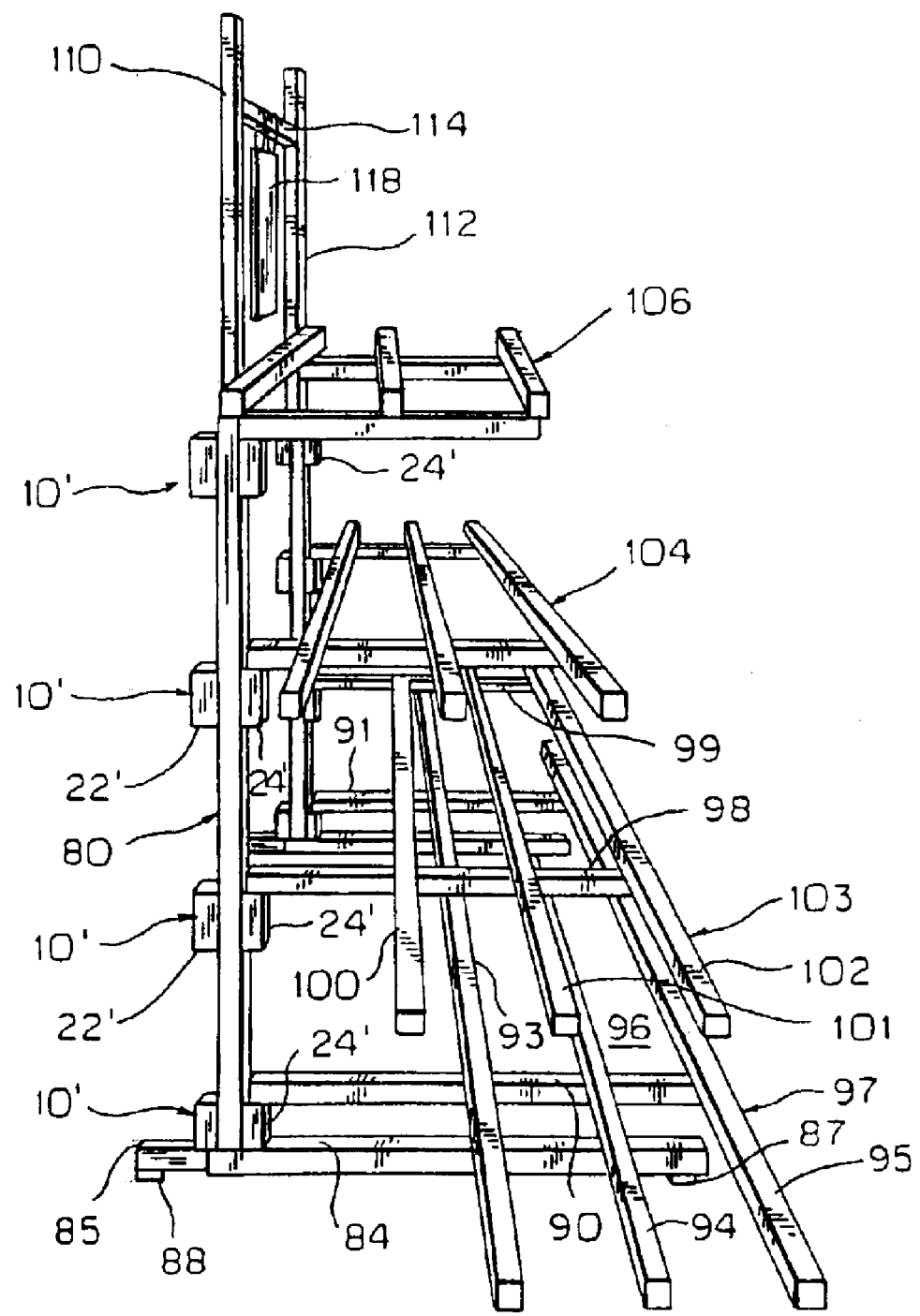
FIG. 9 is a perspective view of a display or storage rack assembled from a support frame kit using the components of FIGS. 7 and 8.

In the embodiment of FIG. 9, the second pair of rails 90 and 91 are mounted on the upper end of the bottom socket 24' and are joined to one another by at least one longitudinally extending member. Preferably, the rails 90 and 91 are joined by three horizontal struts 93, 94 and 95 which are welded to the rails 90 and 91 to provide a rigid horizontal frame member 96 which serves as a bottom shelf 97 when the non-rotatable pintles 13' are inserted into the sockets 24' (see FIGS. 5 and 6). Positioned in second couplings 10' at a second station spaced above the bottom coupling 10' is a second display rack element formed of rails 98 and 99 which are shorter than the rails 90 and 91. The rails 98 and 99 are joined by three struts 100, 101 and 102 to form a second shelf 103 which is a width less than the first shelf 97. The pintles 13' are retained in the sockets 24' of the coupling 10' at the second station in order to rigidly support the second shelf 103.

In the illustrated embodiment of FIG. 9 there are two additional shelves 104 and 106 which are similar to the first shelves 97 and 100 in that they are formed by welding horizontal struts to horizontal rails, but have narrower widths. Consequently, as the height of the display rack 83 increases, the widths of the shelves decrease. This provides a stable arrangement because loads on the bottom shelf 97 are further from the longitudinal axes of the posts 14' and counteract the torque from loads placed on the upper shelves 103, 104 and 106.

The display rack 83 has a pair of post extensions 110 and 112 joined by a top rail 114, which extensions are welded to the back of top strut 116 on the top shelf 106. The top rail 114 has a sign 118 suspended therefrom.

Figure 10:
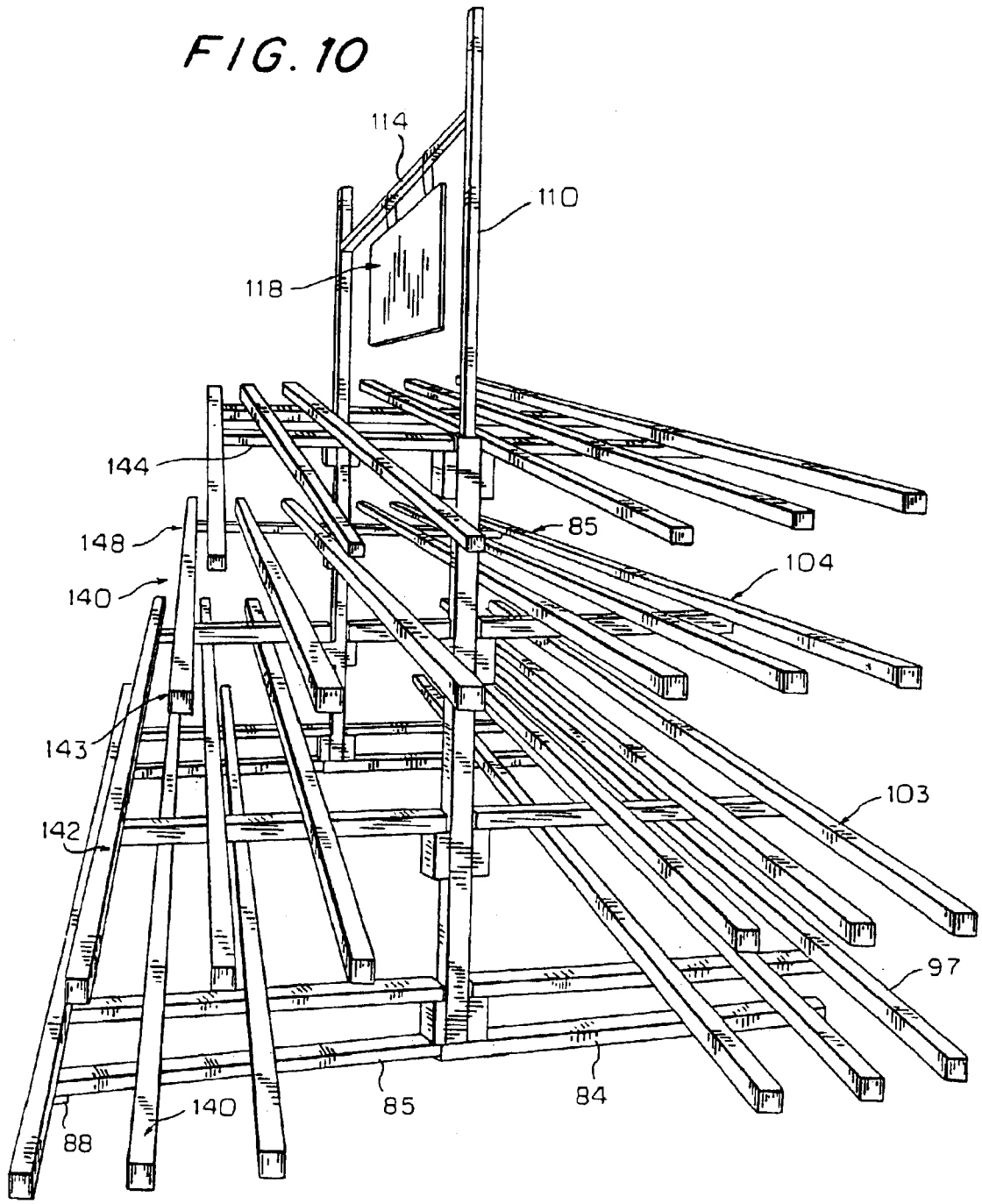
FIG. 10 is an expansion of the storage and display rack of FIG. 9.

Referring now to FIG. 10, a double sided rack 140 is shown wherein the sockets 24' each have shelves 141–144 identically configured to the shelves 97, 103, 104 and 106 of FIG. 9, but which project laterally in the opposite direction from the posts 14' to provide a double sided display rack 148. As with the arrangement of FIG. 9, the double side display rack 148 of FIG. 10 has a lower shelf which preferably projects further from the posts 14' than the upper shelves 142, 143 and 144 so as to stabilize the display rack.

Figure 11:
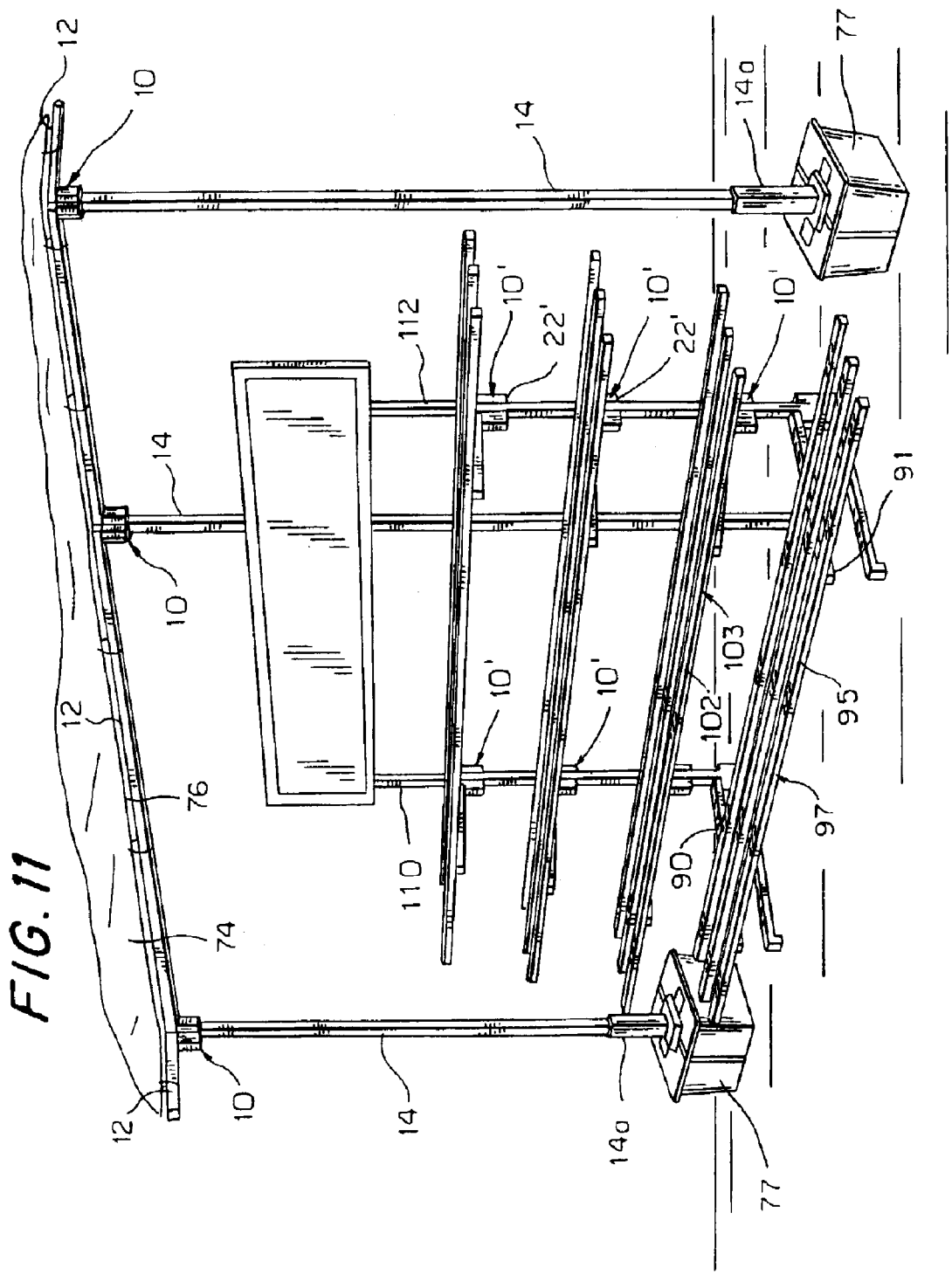
FIG. 11 is a perspective view showing the storage display rack of FIG. 9 in combination with the canopy of FIG. 4.

As is seen in FIG. 11, the display racks of FIGS. 9 and 10 may be incorporated with the canopy 74 of FIG. 4 so as to provide a garden center which combines display racks with a canopy. In this way, canopies 74 and display racks 83 and 140 have a resemblance so as to provide a marketing area for garden type products having a unity of impression.

From the foregoing description, one skilled in the art can easily ascertain the essential characteristics of this invention, and without departing from the spirit and scope thereof, can make various changes and modifications of the invention to adapt it to various usages and conditions.

We claim:

1. An arrangement for supporting a canopy suitable for accommodating people and items of interest to retail consumers, the arrangement comprising in combination:

an array of rectangular posts, each post having four vertical sides, a top end and a bottom end with a rail coupling at the top end, the rail coupling consisting essentially of a rectangular socket fixed to each of the vertical sides;

an array of rectangular rails, each having post couplings consisting essentially of a rectangular pintle projecting therefrom at first and second ends thereof;

a canopy support frame consisting essentially of the rectangular rails being supported in spaced relation to the ground by receipt of the rectangular pintles in the rectangular sockets of at least four vertically disposed posts with the connected post and rail couplings being the only couplings attaching the vertically extending posts to one another thereby providing unobstructed vertical spaces between adjacent posts, and a canopy connected to the rails and held in spaced relation to the ground by the posts to at least shield ground beneath the canopy from sun light.

2. The arrangement of claim 1 wherein the canopy support frame includes interior posts with each post coupled to four rails to provide interior supports and exterior posts each being coupled to two rails and located beneath the periphery of the canopy.

3. The arrangement of claim 1 wherein the pintles are retained within the sockets by pins which pass through holes in the pintles and sockets.

4. The arrangement of claim 3 further including a supporting base for at least some of the posts, the supporting base comprising a container having concrete therein holding vertical a post support which is received in or over one of the posts.

5. The arrangement of claim 1 wherein the posts, sockets, rails and pintles are square.

6. The arrangement of claim 5 further including therewith, a support frame assembled from a support frame kit and at least one shelf assembled therewith to form a display rack, the combination comprising:

a pair of square posts each having a pair of square sockets fixed adjacent to upper and lower ends thereof, as well as at least one location between the upper and lower ends;

a pair of base rails, each having a square pintle inserted into one of the square sockets adjacent to the lower end of one of the posts to support the posts in a vertical orientation, at least one pair of rails having pintles inserted into a pair of sockets above the lower ends of the posts, the at least one pair of rails having a horizontal shelf fixed thereto to laterally brace the posts and to support display items thereon.

7. The arrangement of claim 6 wherein the shelf is comprised of a plurality of struts welded to the rails.

8. The arrangement of claim 7 wherein there is more than one shelf disposed above the base rails.

9. The arrangement of claim 1 wherein the canopy is made of flexible fabric.

* * * * *